(12) United States Patent
Kucharski et al.

(10) Patent No.: US 12,113,577 B2
(45) Date of Patent: Oct. 8, 2024

(54) METHOD AND SYSTEM FOR ENCODING MULTI-LEVEL PULSE AMPLITUDE MODULATED SIGNALS USING INTEGRATED OPTOELECTRONIC DEVICES

(71) Applicant: Cisco Technology, Inc., San Jose, CA (US)

(72) Inventors: Daniel Kucharski, Carlsbad, CA (US); Sherif Abdalla, Carlsbad, CA (US); Brian Welch, San Diego, CA (US)

(73) Assignee: Cisco Technology, Inc., San Jose, CA (US)

( * ) Notice: Subject to any disclaimer, the term of this patent is extended or adjusted under 35 U.S.C. 154(b) by 121 days.

(21) Appl. No.: 17/453,408

(22) Filed: Nov. 3, 2021

(65) Prior Publication Data

US 2022/0247495 A1 Aug. 4, 2022

Related U.S. Application Data

(63) Continuation of application No. 16/424,137, filed on May 28, 2019, now Pat. No. 11,212,007, which is a
(Continued)

(51) Int. Cl.
*G02B 26/00* (2006.01)
*G02B 26/06* (2006.01)
(Continued)

(52) U.S. Cl.
CPC ......... *H04B 10/5161* (2013.01); *G02B 26/06* (2013.01); *G02F 1/0121* (2013.01);
(Continued)

(58) Field of Classification Search
CPC ...... G02F 1/0121; G02F 1/225; G02F 1/2255; G02F 1/212; G02F 2201/58; G02B 26/06;
(Continued)

(56) References Cited

U.S. PATENT DOCUMENTS

| | | | |
|---|---|---|---|
| 2005/0036791 A1* | 2/2005 | Gunn, III | H04B 10/5051 398/183 |
| 2006/0269294 A1* | 11/2006 | Kikuchi | H04B 10/5561 398/161 |
| 2008/0056727 A1* | 3/2008 | Nishihara | H04B 10/5165 398/155 |

FOREIGN PATENT DOCUMENTS

| | | | | |
|---|---|---|---|---|
| EP | 1793513 B1 * | 11/2010 | | H04B 10/505 |
| JP | 2008092172 A * | 4/2008 | | H04B 10/505 |
| WO | WO-2007013356 A1 * | 2/2007 | | H04B 10/504 |

* cited by examiner

*Primary Examiner* — Mahidere S Sahle
(74) *Attorney, Agent, or Firm* — Patterson + Sheridan, LLP

(57) ABSTRACT

Methods and systems for encoding multi-level pulse amplitude modulated signals using integrated optoelectronics are disclosed and may include generating a multi-level, amplitude-modulated optical signal utilizing an optical modulator driven by first and second electrical input signals, where the optical modulator may configure levels in the multi-level amplitude modulated optical signal, drivers are coupled to the optical modulator; and the first and second electrical input signals may be synchronized before being communicated to the drivers. The optical modulator may include optical modulator elements coupled in series and configured into groups. The number of optical modular elements and groups may configure the number of levels in the multi-level amplitude modulated optical signal. Unit drivers may be coupled to each of the groups. The electrical input signals may be synchronized before communicating them to the unit drivers utilizing flip-flops. Phase addition may be synchronized utilizing one or more electrical delay lines.

8 Claims, 7 Drawing Sheets

Related U.S. Application Data continuation of application No. 15/407,440, filed on Jan. 17, 2017, now Pat. No. 10,305,597, which is a continuation of application No. 14/196,122, filed on Mar. 4, 2014, now Pat. No. 9,548,811, which is a continuation of application No. 13/568,616, filed on Aug. 7, 2012, now Pat. No. 8,665,508, which is a continuation of application No. 12/555,291, filed on Sep. 8, 2009, now Pat. No. 8,238,014.

(60) Provisional application No. 61/191,480, filed on Sep. 8, 2008.

(51) Int. Cl.
| | | |
|---|---|---|
| *G02F 1/01* | (2006.01) | |
| *G02F 1/225* | (2006.01) | |
| *H04B 10/079* | (2013.01) | |
| *H04B 10/50* | (2013.01) | |
| *H04B 10/516* | (2013.01) | |
| *H04B 10/54* | (2013.01) | |
| *G02B 26/08* | (2006.01) | |
| *G02F 1/21* | (2006.01) | |

(52) U.S. Cl.
CPC ............ *G02F 1/225* (2013.01); *G02F 1/2255* (2013.01); *H04B 10/0795* (2013.01); *H04B 10/505* (2013.01); *H04B 10/5053* (2013.01); *H04B 10/541* (2013.01); *G02B 26/0841* (2013.01); *G02F 1/212* (2021.01); *G02F 2201/58* (2013.01)

(58) Field of Classification Search
CPC ............ G02B 26/0841; H04B 10/5161; H04B 10/0795; H04B 10/505; H04B 10/5053; H04B 10/541
USPC .................................. 359/237–297
See application file for complete search history.

METHOD AND SYSTEM FOR ENCODING MULTI-LEVEL PULSE AMPLITUDE MODULATED SIGNALS USING INTEGRATED OPTOELECTRONIC DEVICES

CROSS-REFERENCE TO RELATED APPLICATIONS/INCORPORATION BY REFERENCE

This application is a continuation of application Ser. No. 16/424,137 filed on May 28, 2019, which is a continuation of application Ser. No. 15/407,440 filed on Jan. 17, 2017, now U.S. Pat. No. 10,305,597, which is a continuation of application Ser. No. 14/196,122 filed on Mar. 4, 2014, now U.S. Pat. No. 9,548,811, which is a continuation of application Ser. No. 13/568,616 filed on Aug. 7, 2012, now U.S. Pat. No. 8,665,508, which is a continuation of application Ser. No. 12/555,291 filed on Sep. 8, 2009, now U.S. Pat. No. 8,238,014, which in turn makes reference to, claims priority to and claims the benefit of: U.S. Provisional Patent Application No. 61/191,480 filed on Sep. 8, 2008.

This application also makes reference to U.S. Pat. No. 7,039,258.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to signal processing. More specifically, certain embodiments of the invention relate to a method and system for encoding multi-level pulse amplitude modulated signals using integrated optoelectronics.

BACKGROUND OF THE INVENTION

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for encoding multi-level pulse amplitude modulated signals using integrated optoelectronics, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for encoding multi-level pulse amplitude modulated signals using integrated optoelectronics. Exemplary aspects of the invention may comprise generating a multi-level, amplitude-modulated optical signal utilizing an optical modulator driven by two or more of a plurality of electrical input signals. The optical modulator may comprise a plurality of optical modulator elements coupled in series and configured into a plurality of groups. The number of the optical modular elements and the plurality of groups may configure the number of levels in the multi-level amplitude modulated optical signal. Unit drivers may be coupled to each of the plurality of groups of the optical modulator elements. The plurality of electrical input signals may be synchronized before communicating the signals to the unit drivers utilizing flip-flops. Two or more of the plurality of electrical input signals may be selected utilizing one or more multiplexers, which may select an electrical input or a complement of the electrical input. Phase addition may be synchronized in the plurality of optical modulator elements utilizing one or more electrical delay lines. The optical modulator may be integrated on a single substrate, which may comprise one of: silicon, gallium arsenide, germanium, indium gallium arsenide, or indium phosphide. The optical modulator may comprise a Mach-Zehnder interferometer and/or one or more ring modulators.

Figure 1A:
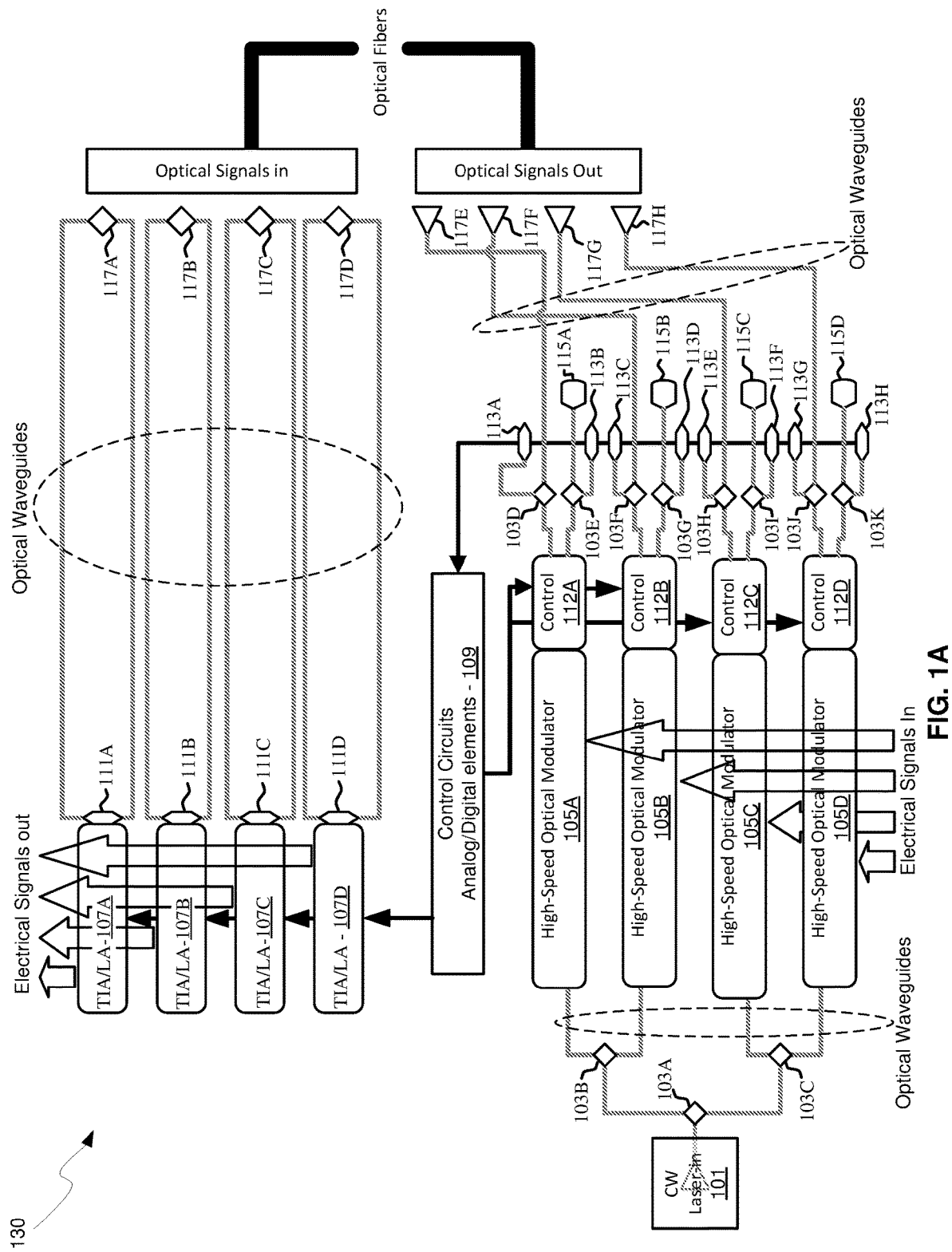
FIG. 1A is a block diagram of a photonically enabled CMOS chip, in accordance with an embodiment of the invention.

FIG. 1A is a block diagram of a photonically enabled CMOS chip, in accordance with an embodiment of the invention. Referring to FIG. 1A, there is shown optoelectronic devices on a CMOS chip 130 comprising high speed optical modulators 105A-105D, high-speed photodiodes 111A-111D, monitor photodiodes 113A-113H, and optical devices comprising taps 103A-103K, optical terminations 115A-115D, and grating couplers 117A-117H. There is also shown electrical devices and circuits comprising transimpedance and limiting amplifiers (TIA/LAs) 107A-107E, analog and digital control circuits 109, and control sections 112A-112D. Optical signals are communicated between optical and optoelectronic devices via optical waveguides fabricated in the CMOS chip 130.

The high speed optical modulators 105A-105D comprise Mach-Zehnder or ring modulators, for example, and enable the modulation of the CW laser input signal. The high speed optical modulators 105A-105D are controlled by the control sections 112A-112D, and the outputs of the modulators are optically coupled via waveguides to the grating couplers 117E-117H. The taps 103D-103K comprise four-port optical couplers, for example, and are utilized to sample the optical signals generated by the high speed optical modulators 105A-105D, with the sampled signals being measured by the monitor photodiodes 113A-113H. The unused branches of the taps 103D-103K are terminated by optical terminations 115A-115D to avoid back reflections of unwanted signals.

The grating couplers 117A-117H comprise optical gratings that enable coupling of light into and out of the CMOS chip 130. The grating couplers 117A-117D are utilized to couple light received from optical fibers into the CMOS chip 130, and the grating couplers 117E-117H are utilized to couple light from the CMOS chip 130 into optical fibers. The optical fibers may be epoxied, for example, to the CMOS chip, and may be aligned at an angle from normal to the surface of the CMOS chip 130 to optimize coupling efficiency.

The high-speed photodiodes 111A-111D convert optical signals received from the grating couplers 117A-117D into electrical signals that are communicated to the TIA/LAs 107A-107D for processing. The analog and digital control circuits 109 may control gain levels or other parameters in the operation of the TIA/LAs 107A-107D. The TIA/LAs 107A-107D then communicate electrical signals off the CMOS chip 130.

The control sections 112A-112D comprise electronic circuitry that enable modulation of the CW laser signal received from the splitters 103A-103C. The high speed optical modulators 105A-105D require high-speed electrical signals to modulate the refractive index in respective branches of a Mach-Zehnder interferometer (MZI), for example. The voltage swing required for driving the MZI is a significant power drain in the CMOS chip 130. Thus, if the electrical signal for driving the modulator may be split into domains with each domain traversing a lower voltage swing, power efficiency is increased.

Figure 1B:
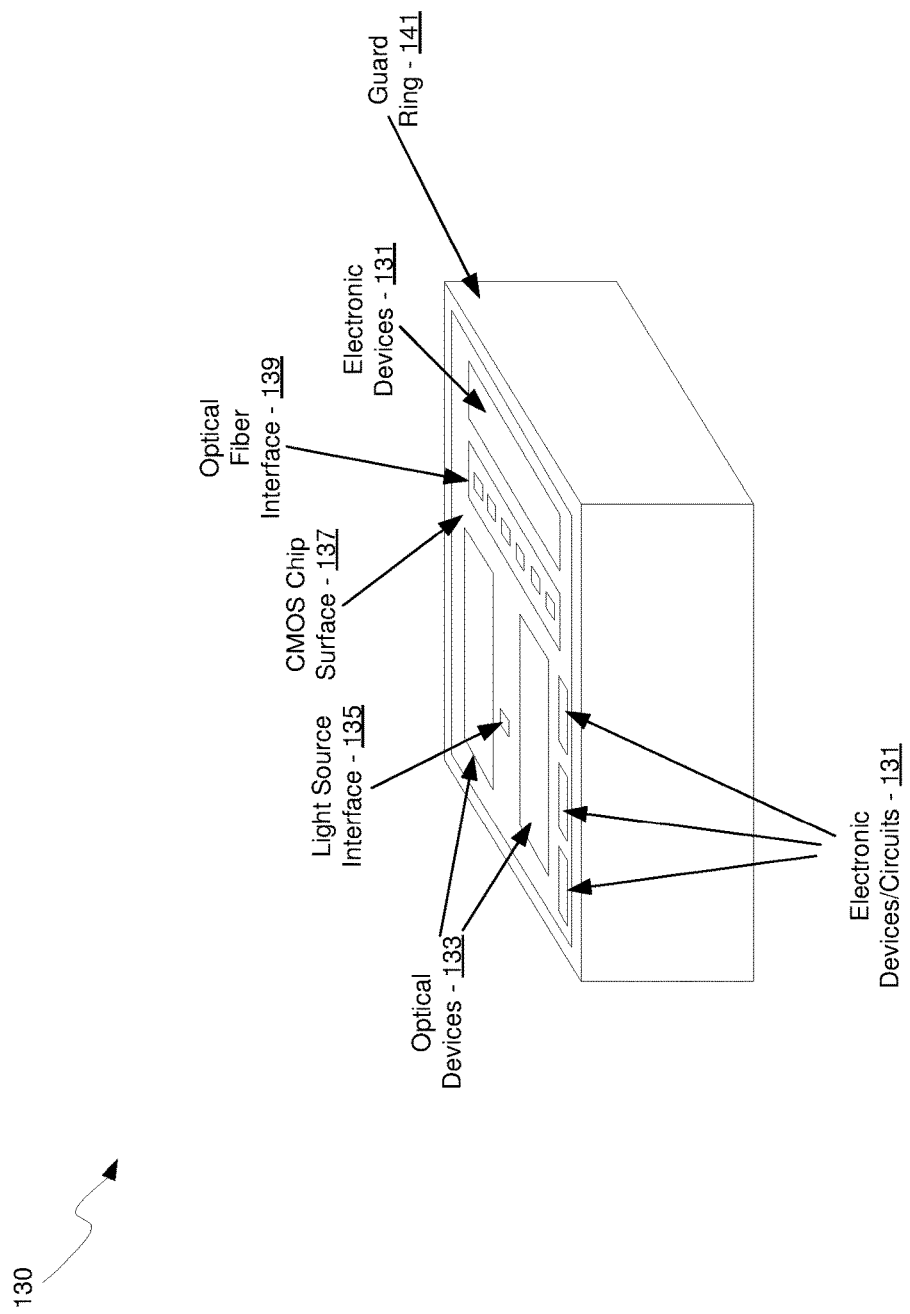
FIG. 1B is a diagram illustrating an exemplary CMOS chip, in accordance with an embodiment of the invention.

FIG. 1B is a diagram illustrating an exemplary CMOS chip, in accordance with an embodiment of the invention. Referring to FIG. 1B, there is shown the CMOS chip 130 comprising electronic devices/circuits 131, optical and optoelectronic devices 133, a light source interface 135, CMOS chip surface 137, an optical fiber interface 139, and CMOS guard ring 141.

The light source interface 135 and the optical fiber interface 139 comprise grating couplers that enable coupling of light signals via the CMOS chip surface 137, as opposed to the edges of the chip as with conventional edge-emitting devices. Coupling light signals via the CMOS chip surface 137 enables the use of the CMOS guard ring 141 which protects the chip mechanically and prevents the entry of contaminants via the chip edge.

The electronic devices/circuits 131 comprise circuitry such as the TIA/LAs 107A-107D and the analog and digital control circuits 109 described with respect to FIG. 1A, for example. The optical and optoelectronic devices 133 comprise devices such as the taps 103A-103K, optical terminations 115A-115D, grating couplers 117A-117H, high speed optical modulators 105A-105D, high-speed photodiodes 111A-111D, and monitor photodiodes 113A-113H.

Figure 1C:
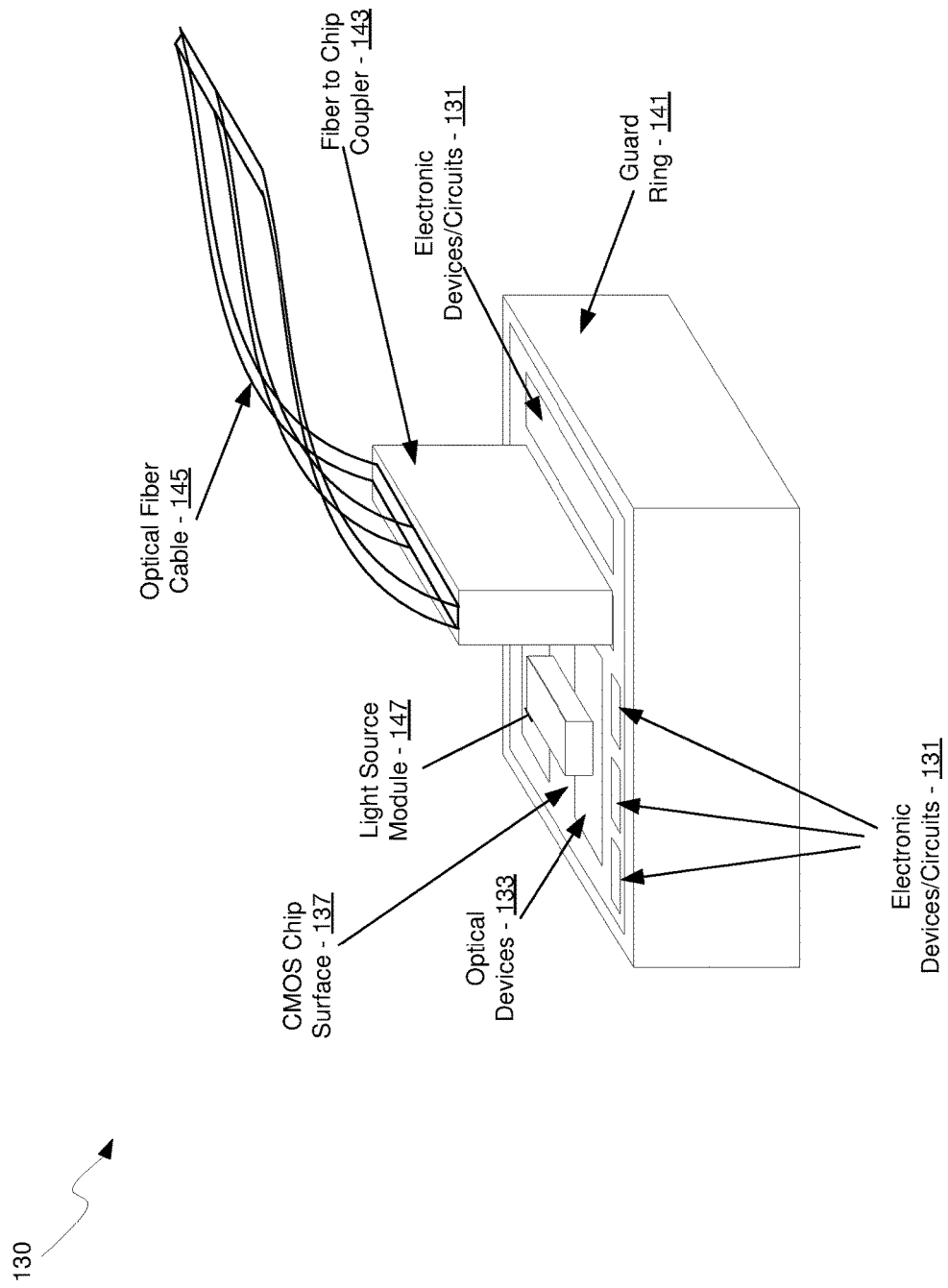
FIG. 1C is a diagram illustrating an exemplary CMOS chip coupled to an optical fiber cable, in accordance with an embodiment of the invention.

FIG. 1C is a diagram illustrating an exemplary CMOS chip coupled to an optical fiber cable, in accordance with an embodiment of the invention. Referring to FIG. 1C, there is shown the CMOS chip 130 comprising the electronic devices/circuits 131, the optical and optoelectronic devices 133, the light source interface 135, the CMOS chip surface 137, and the CMOS guard ring 141. There is also shown a fiber to chip coupler 143, an optical fiber cable 145, and a light source module 147.

The CMOS chip 130 comprising the electronic devices/circuits 131, the optical and optoelectronic devices 133, the light source interface 135, the CMOS chip surface 137, and the CMOS guard ring 141 may be as described with respect to FIG. 1B.

In an embodiment of the invention, the optical fiber cable may be affixed, via epoxy for example, to the CMOS chip surface 137. The fiber chip coupler 143 enables the physical coupling of the optical fiber cable 145 to the CMOS chip 130.

The light source module 147 may be affixed, via epoxy or solder, for example, to the CMOS chip surface 137. In this manner a high power light source may be integrated with optoelectronic and electronic functionalities of one or more high-speed optoelectronic transceivers on a single CMOS chip.

A distributed Mach-Zehnder interferometer (MZI) comprises a number of unit drivers each receiving an electrical signal and amplifying it to drive a separate optical modulating element in one of the MZI arms. The modulating elements may use the electrical signal from the unit drivers to create a phase shift in the optical carrier. Such a phase shift may be directly additive as light travels from one modulating element to the next, and may accumulate along each of the interferometer arms, allowing the MZI to achieve a significant phase difference between the optical signals in the two arms. When the light is recombined, the resulting constructive and destructive interference patterns may create a two-level amplitude envelope which follows the applied electrical signal. High-speed amplitude modulation may be achieved when the electrical signals feeding the unit drivers are delayed relative to each other to match the propagation delay of light in the MZI waveguides. The high-amplitude optical output may represent logic '1' and a low-amplitude output may represent logic '0'. Thus, one data bit may be conveyed by each unit interval of the waveform. By utilizing more than two amplitude levels, more bits per unit interval may be communicated. For example, PAM-4 sends two bits per unit interval, PAM-8 sends 3, and PAM-16 sends 4.

In an embodiment of the invention, the distributed MZI may be integrated on a single chip, such as the CMOS chip 130. The substrate may comprise silicon, or other semiconductor material such as germanium, indium phosphide, gallium arsenide, or indium gallium arsenide.

Figure 2:
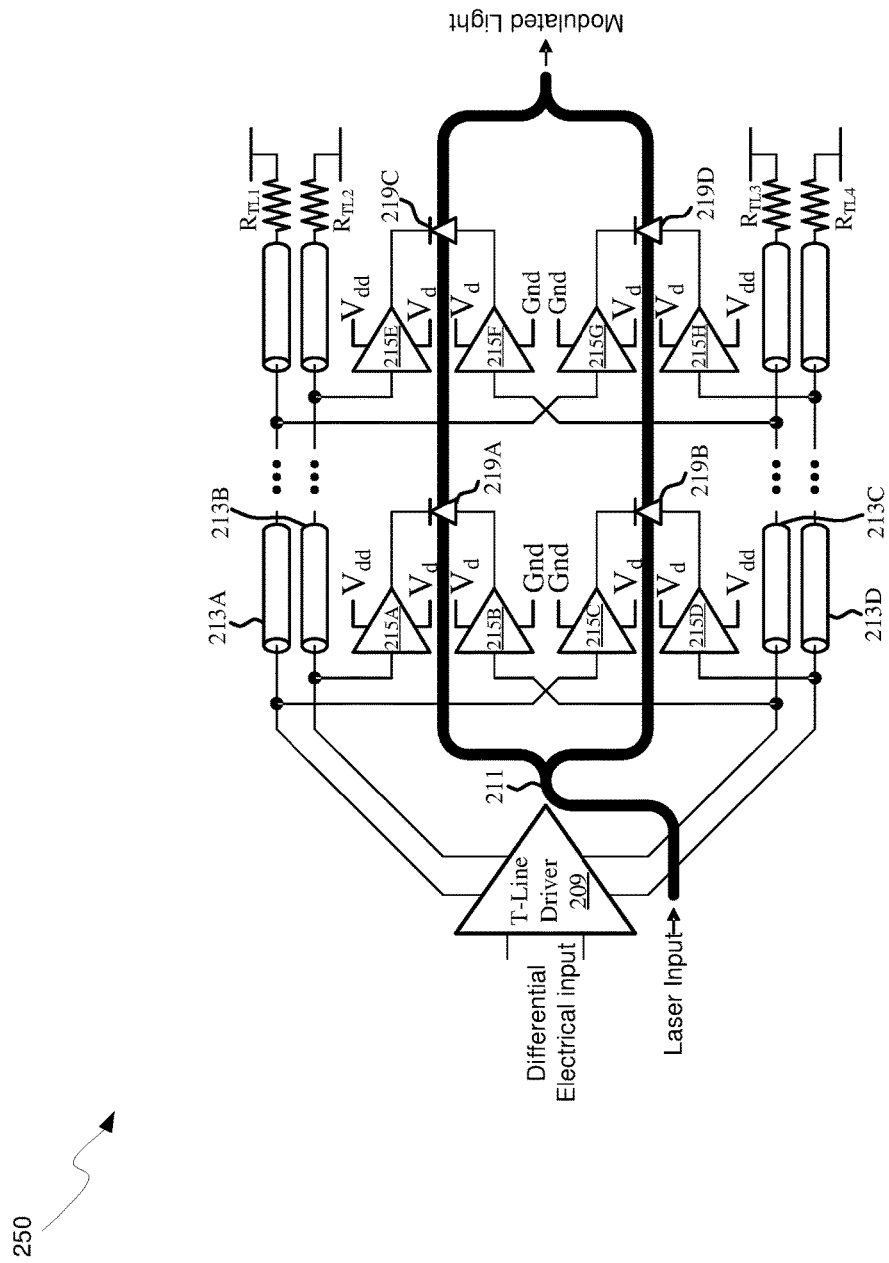
FIG. 2 is a block diagram of an exemplary split domain Mach-Zehnder modulator, in accordance with an embodiment of the invention.

FIG. 2 is a block diagram of an exemplary split domain Mach-Zehnder modulator, in accordance with an embodiment of the invention. Referring to FIG. 2, there is shown a split-domain Mach-Zehnder modulator (MZM) 250 comprising a transmission line driver 209, waveguides 211, transmission lines 213A-213D, diode drivers 215A-215H, diodes 219A-219D, and transmission line termination resistors $R_{TL1}$-$R_{TL4}$. There is also shown voltage levels Vdd, Vd, and Gnd. In an embodiment of the invention, Vd is equal to a voltage of Vdd/2, thus generating two voltage domains, due to the symmetric nature of the stacked circuits. However, the invention is not limited to two voltage domains. Accordingly, any number of voltage domains may be utilized, dependent on the desired voltage swing of each domain and the total voltage range, defined here as Vdd to ground. Similarly, the magnitude of the voltage range in each voltage domain may be a different value than other domains.

The transmission line (T-line) driver 209 comprises circuitry for driving transmission lines in an even-coupled mode, where the signal on each pair of transmission lines is equal except with a DC offset. In this manner, two or more voltage domains may be utilized to drive the diodes that generate index changes in the respective branches of the MZM 250. In another embodiment of the invention, the T-line driver 209 may drive transmission lines in odd-coupled mode. Even-coupled mode may result in a higher impedance in the transmission line, whereas odd-coupling may result in lower impedance.

The waveguides 211 comprise the optical components of the MZM 250 and enable the routing of optical signals around the CMOS chip 130. The waveguides 211 comprise silicon and silicon dioxide, formed by CMOS fabrication processes, utilizing the index of refraction difference between Si and $SiO_2$ to confine an optical mode in the waveguides 211. The transmission line termination resistors $R_{TL1}$-$R_{TL4}$ enable impedance matching to the T-lines 213A-213D and thus reduced reflections.

The diode drivers 215A-215H comprise circuitry for driving the diodes 219A-219D, thereby changing the index of refraction locally in the waveguides 211. This index change in turn changes the velocity of the optical mode in the waveguides 211, such that when the waveguides merge again following the driver circuitry, the optical signals interfere constructively or destructively, thus modulating the laser input signal. By driving the diodes 219A-219D with a differential signal, where a signal is driven at each terminal of a diode, as opposed to one terminal being tied to AC ground, both power efficiency and bandwidth may be increased due to the reduced voltage swing required in each domain.

In operation, a CW optical signal is coupled into the "Laser Input", and a modulating differential electrical signal is communicated to the T-line driver 209. The T-line driver 209 generates complementary electrical signals to be communicated over the T-lines 213A-213D, with each pair of signals offset by a DC level to minimize the voltage swing of each diode driver 215A-215H, while still enabling a full voltage swing across the diodes 219A-219D.

Reverse biasing the diodes 219A-219D generates field effects that change the index of refraction and thus the speed of the optical signal propagating through the waveguides 213A-213D. The optical signals then interfere constructively or destructively, resulting in the "Modulated Light" signal.

A distributed Mach-Zehnder interferometer (MZI) comprises a number of unit drivers each receiving an electrical signal and amplifying it to drive a separate optical modulating element in one of the MZI arms. The modulating elements may use the electrical signal from the unit drivers to create a phase shift in the optical carrier. Such a phase shift may be directly additive as light travels from one modulating element to the next, and may accumulate along each of the interferometer arms, allowing the MZI to achieve a significant phase difference between the optical signals in the two arms. When the light is recombined, the resulting constructive and destructive interference patterns may create a two-level amplitude envelope which follows the applied electrical signal. High-speed amplitude modulation may be achieved when the electrical signals feeding the unit drivers are delayed relative to each other to match the propagation delay of light in the MZI waveguides. The high-amplitude optical output may represent logic '1' and a low-amplitude output may represent logic '0'. Thus, one data bit may be conveyed by each unit interval of the waveform.

In an embodiment of the invention, the distributed MZI may be integrated on a single substrate and single chip. The substrate may comprise silicon, or other semiconductor material such as germanium, indium phosphide, gallium arsenide, or indium gallium arsenide.

Figure 3:
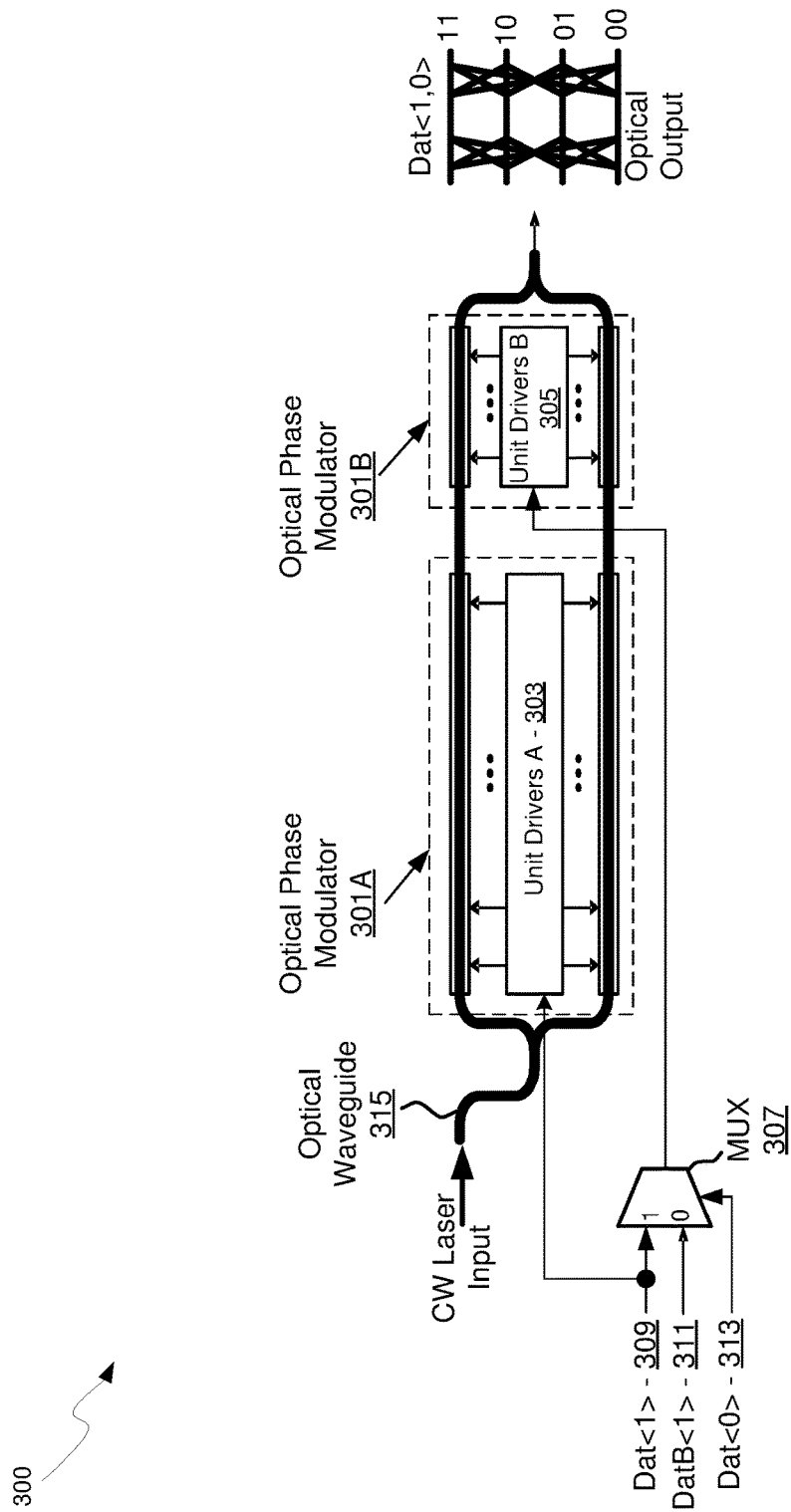
FIG. 3 is a schematic of an exemplary multi-level pulse-amplitude modulated Mach-Zehnder interferometer, in accordance with an embodiment of the invention.

FIG. 3 is a schematic of an exemplary multi-level pulse-amplitude modulated Mach-Zehnder interferometer, in accordance with an embodiment of the invention. Referring to FIG. 3, there is shown multi-level PAM MZI 300 comprising optical phase modulators 301A and 301B, unit drivers A 303, unit drivers B 305, a multiplexer (MUX) 307, and an optical waveguide 315. There is also shown input data streams Dat<1> 309, DatB<1> 311, Dat<0> 313, a CW laser input, and an optical output. The optical waveguide may be substantially similar to the waveguides 211 described with respect to FIG. 2.

The optical phase modulators 301A and 301B may comprise sections of the optical waveguide 315 and the unit drivers A 303 and B 305, respectively. The unit drivers A 303 and B 305 may comprise distributed drivers, such as the diode drivers 215A-215H described with respect to FIG. 2, that may enable multi-level modulation directly in the optical domain. The modular nature of a distributed driver may enable the division into two or more banks of unit drivers, each receiving a different electrical signal, which can add or subtract optical carrier phase in each of the MZI arms via the optical modulators. Thus, as the number of unit drivers and their bandwidth tend to infinity, optical waveform envelopes of arbitrary shape and complexity may be generated. The MUX 307 may comprise a multiplexer for switching between desired inputs Dat<1> and its binary complement DatB<1>. For higher order PAM, the multiplexing logic may require more inputs and outputs, and consequently, more complexity.

In operation, the multi-level PAM MZI 300 may be enabled to modulate a CW laser input, generating a 4-level PAM optical output. The predominant application of optical modulators is in data communication. A modulated waveform may be subdivided into unit intervals, each representing one or more bits, depending on the number of possible envelope levels. Two-level pulse amplitude modulation (PAM-2) is the most common, as it maintains a large energy distance between two possible values ('1' or '0'), which increases signal-to-noise ratio (SNR) and reduces the probability of errors due to additive noise. High data throughput is one of the key objectives in designing data communication systems, and one option for increased throughput is to reduce the duration of the unit interval. However, this may be constrained by the circuit and modulator bandwidth. In an embodiment of the invention, data throughput may be increased by encoding multiple bits of information in each unit interval. This may be accomplished by subdividing the available signal energy into a higher number of discrete levels. This produces a PAM-N modulation, where N is the number of levels and ln(N)/ln(2) is the number of data bits in each unit interval. PAM encoding may be accomplished in the electrical domain using digital to analog converters (DACs) followed by linear amplifiers. Due to DAC settling requirements and linear amplifier gain and bandwidth variations across process, voltage, and temperature (PVT), such blocks are challenging to design for high-speed operation.

Figure 4:
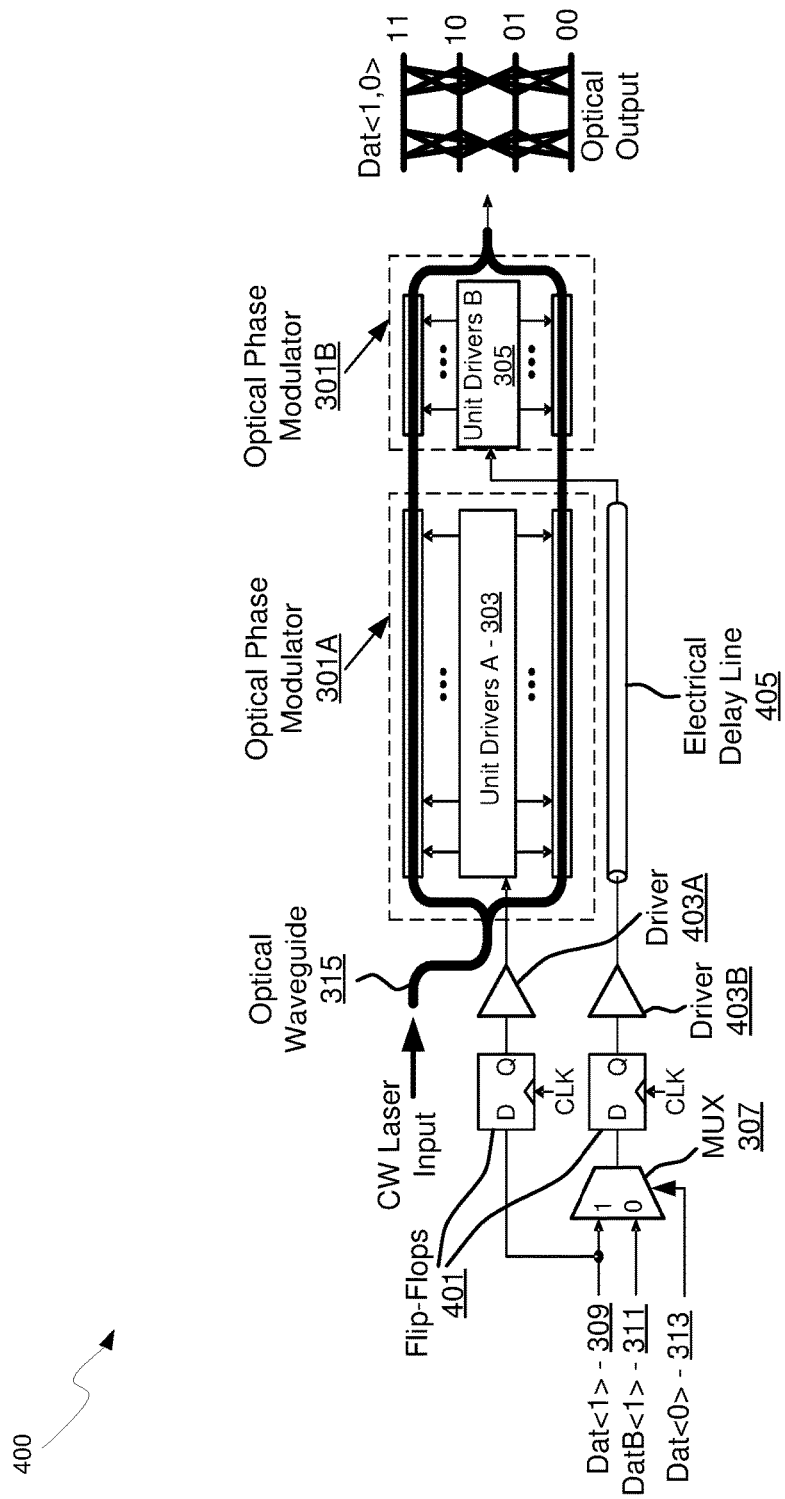
FIG. 4 is a schematic of an exemplary multi-level pulse-amplitude modulated Mach-Zehnder interferometer with associated electronics for high-speed optical modulation, in accordance with an embodiment of the invention

In an embodiment of the invention, analog circuit complexity may be reduced by operating with 2-level binary signals in the electrical domain while creating multi-level signals in the optical domain. For simplicity, FIGS. 3 and 4 illustrate PAM-4 embodiments, but the invention need not be so limited. Higher-order PAM may be implemented depending on the desired data throughput and SNR. The multi-level PAM MZI 300 may receive two parallel binary data streams Dat<0> and Dat<1>. Their complements DatB<0> and DatB<1> are also available, as is the case in high-speed differential logic circuits.

The unit driver for the multi-level PAM MZI 300 may be divided into two banks. The first bank, unit drivers A 303, may comprise ⅔ of the total number of unit drivers, for example, while the second bank, unit drivers B 305, may comprise ⅓ of the unit drivers, each unit driver being connected to a dedicated pair of optical modulating element—one in each MZI arm. The unit drivers A 303 and B 305 may feature differential outputs to drive each MZI arm with electrical signals which are 180° out of phase to maximize the phase difference in both arms. Dat<1> may be sent to the unit drivers A 303 while Dat<0> may be used to control the MUX 307 which sends either Dat<1> or its binary complement DatB<1> to the unit drivers B 305.

In the optical domain, Dat<1> may create a positive or negative optical carrier phase shift in each of the MZI arms. The phase shift of the unit drivers B 305 may be added to or subtracted from the phase shift generated by the unit drivers A 303. Assuming that all unit drivers and their respective optical phase modulators are identical, the amount of phase shift generated by each bank may be proportional to the number of elements it contains. Thus ⅔ and ⅓ banks can create 4 levels corresponding to 0, ⅓, ⅔, and 1 of the total available envelope range, which correspond to binary numbers of 00, 01, 10, and 11 respectively. Thus, each unit interval in the optical domain contains two bits of information. Accordingly, any number of unit drivers may be utilized to configure the total number of PAM output levels.

FIG. 4 is a schematic of an exemplary multi-level pulse-amplitude modulated Mach-Zehnder interferometer with associated electronics for high-speed optical modulation, in accordance with an embodiment of the invention. Referring to FIG. 4, there is shown a multi-level PAM MZI 400, which may be substantially similar to the multi-level PAM MZI 300, but with the added functionality provided by the flip-flops 401, the drivers 403A and 403B, and the electrical delay line 405.

The flip-flops 401 may comprise D-flip-flops, for example, which may enable the synchronization of data signals Dat<1> and the output of the MUX 307 based on a received clock signal, CLK. The drivers 403 may comprise amplifiers for providing gain to the synchronized signals before being communicated to the unit drivers A 303 and B 305. The electrical delay line 405 may be operable to delay the electrical signal from the driver 403B and may enable better synchronization of modulation by the optical phase modulators 301A and 301B. The electrical delay line 405 may be either passive, such as a transmission line, or active, comprising transistor circuits, for example.

In operation, the data streams derived from inputs Dat<1>/DatB<1> and Dat<0>/DatB<0> may be synchronized by the flip-flops 401 and post-amplified by the drivers 403A and 403B before being sent to the unit drivers A 303 and B 305. In addition, the electrical delay line 405 may be utilized on the path to the more distant ⅓-sized modulator bank, the unit drivers B 305. The electrical delay line 405 may be designed to mach the delay of light propagating through the first ⅔-sized modulator bank, the optical phase modulator 301A. This enables high-speed modulation by providing a temporal alignment between the optical carrier phase transitions arriving at each modulating element and the phase transitions contributed by that element, thereby enabling linear phase addition at high data rates.

In another embodiment of the invention, the multi-level PAM MZI 400 may instead comprise one or more ring modulators. In an embodiment of the invention, ring modulators may be utilized to replace linear modulator sections in a Mach-Zehnder modulator. Similarly, the ring modulators may comprise a plurality of modulator elements being configured in groups, with the number of groups as well as the number of elements within the group determining the levels in the PAM-N modulation.

Figure 5:
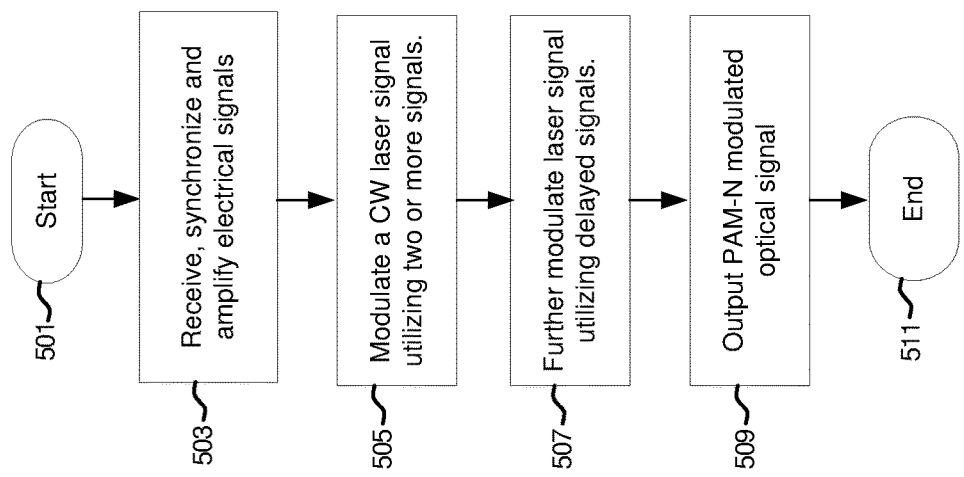
FIG. 5 is a flow chart illustrating exemplary steps in the operation of a multi-level pulse-amplitude modulated Mach-Zehnder interferometer, in accordance with an embodiment of the invention.

FIG. 5 is a flow chart illustrating exemplary steps in the operation of a multi-level pulse-amplitude modulated Mach-Zehnder interferometer, in accordance with an embodiment of the invention. In step 503, after start step 501, electrical data signals are received, selected, synchronized, and amplified followed by end step 511. In step 505, one of the selected, synchronized, and amplified signals may be utilized to drive one or more optical modulator sections that modulates a CW laser input optical signal, while a second set of one or more selected, synchronized, and amplified signals may be delayed utilizing an electrical delay line. In step 507, the modulated optical signal may be further modulated utilizing the one or more delayed electrical signals, and the PAM-N modulated signal may be output in step 509, followed by end step 511

In an embodiment of the invention, a method and system are disclosed for encoding multi-level pulse amplitude modulated signals using integrated optoelectronics. Aspects of the invention may comprise generating a multi-level, amplitude-modulated optical signal utilizing an optical modulator 300/400 driven by two or more of a plurality of electrical input signals Dat<1>, DatB<1>, Dat<0>. The optical modulator 300/400 may comprise a plurality of optical modulator elements coupled in series and configured into a plurality of groups 301A/301B. The number of the optical modular elements and the plurality of groups may configure the number of levels in the multi-level amplitude modulated optical signal. Unit drivers 303/305 may be coupled to each of the plurality of groups of the optical modulator elements. The plurality of electrical input signals Dat<1>, DatB<1>, Dat<0> may be synchronized before communicating the signals to the unit drivers utilizing flip-flops 401. Two or more of the plurality of electrical input signals may be selected utilizing one or more multiplexers 307, which may select an electrical input Dat<1> or a complement of the electrical input DatB<1>. Phase addition may be synchronized in the plurality of optical modulator elements utilizing one or more electrical delay lines 405. The optical modulator 300/400 may be integrated on a single substrate, which may comprise one of: silicon, gallium arsenide, germanium, indium gallium arsenide, indium phosphide, or polymer-based materials. The optical modulator may comprise a Mach-Zehnder interferometer 300/400 or one or more ring modulators.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A system for processing signals, the system comprising:
a plurality of flip-flops arranged to synchronize electrical input signals;
a plurality of drivers arranged to drive the synchronized electrical input signals from the plurality of flip-flops;
a first optical modulator comprising a first set of unit drivers arranged to drive a first plurality of diodes based on the synchronized electrical input signals from the plurality of drivers; and
a second optical modulator comprising a second set of unit drivers arranged to drive a second plurality of diodes based on the synchronized electrical input signals from the plurality of drivers, wherein the first set of unit drivers has more unit drivers than the second set of unit drivers, and wherein the first and second optical modulators are arranged to generate a multi-level, amplitude-modulated optical signal based on the synchronized electrical input signals from the plurality of drivers.

2. The system of claim 1, further comprising one or more multiplexers arranged to select the electrical input signals.

3. The system of claim 2, wherein the one or more multiplexers are arranged to select between an electrical input or a complement of the electrical input.

4. The system of claim 1, further comprising one or more delay lines used to synchronize phase addition in a plurality of optical modulator elements in the first optical modulator.

5. The system of claim 1, wherein the first optical modulator is integrated on a single substrate.

6. The system of claim 5, wherein the single substrate comprises one of: silicon, gallium arsenide, germanium, indium gallium arsenide, indium phosphide, or polymer-based materials.

7. The system of claim 1, wherein the first optical modulator comprises a Mach-Zehnder interferometer.

8. The system of claim 1, wherein the first optical modulator comprises one or more ring modulators.

* * * * *